June 16, 1931. J. W. HOWELL 1,810,275
MANDREL
Filed Nov. 30, 1927
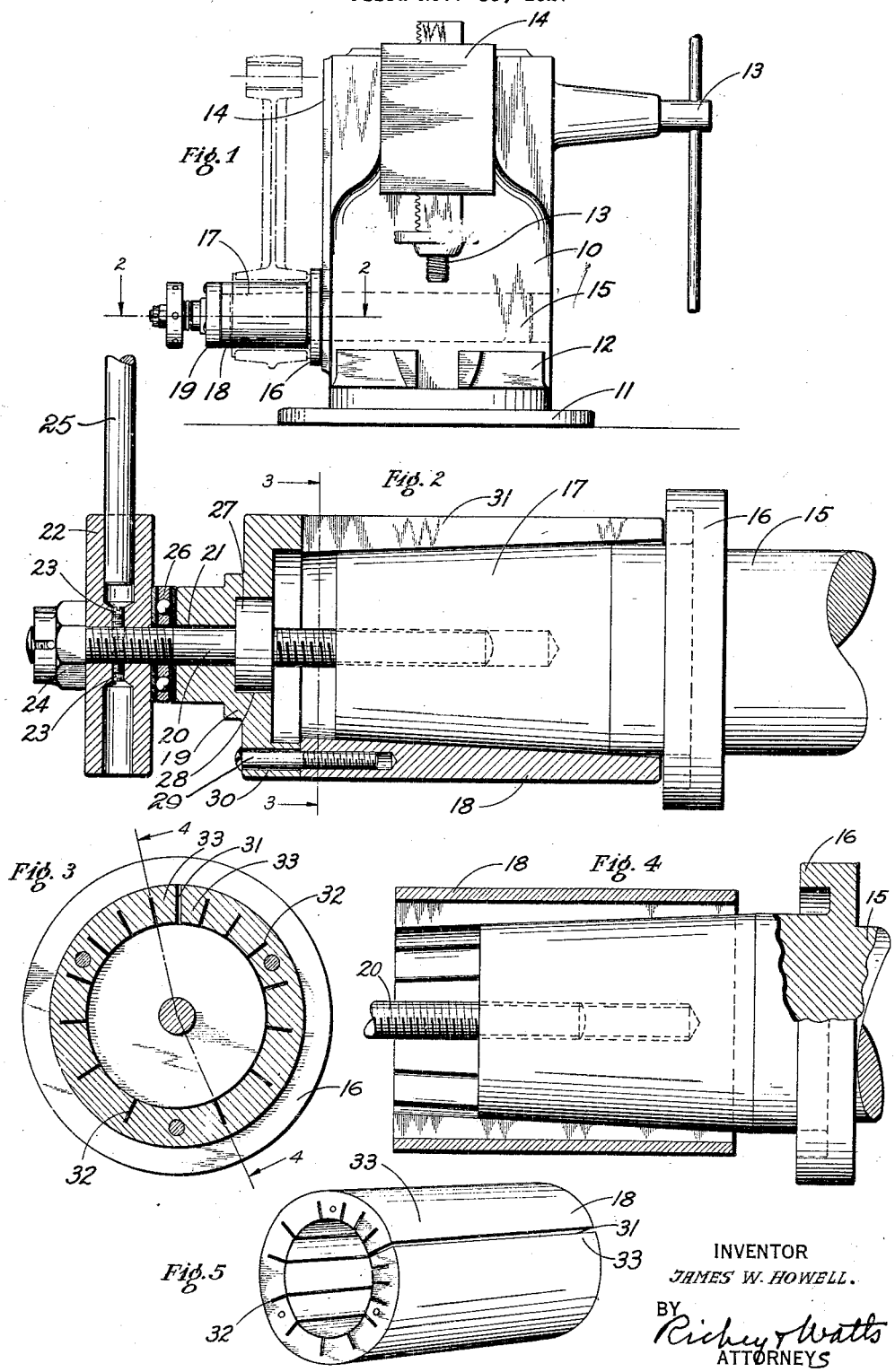
INVENTOR
JAMES W. HOWELL.
BY
Richey & Watts
ATTORNEYS Patented June 16, 1931

1,810,275

UNITED STATES PATENT OFFICE

JAMES W. HOWELL, OF CLEVELAND, OHIO, ASSIGNOR TO THE WHITE MOTOR COMPANY, OF CLEVELAND, OHIO, A CORPORATION OF OHIO

MANDREL

Application filed November 30, 1927. Serial No. 236,631.

This invention relates to fixtures for straightening connecting rods and the like and particularly to expanding mandrels adapted for use thereon.

In the various types of jigs and fixtures employed in straightening connecting rods it has been found that the most expeditious method of supporting the work is by holding the large bored end or crank pin journal of a connecting rod in rigid securement upon a mandrel and bending or twisting the rod about this point until it is suitably straightened and aligned with the piston pin bore. When this method is used there is great danger of marring or distorting the bearing surfaces of a connecting rod which in the usual sequence of operation has been babbitted, finished bored, scraped and accurately fitted to the crank pin. In order to prevent injury to this bearing surface it is essential that the supporting mandrel be of the expanding type rather than the tapered form which would tend to enlarge one side of the connecting rod bearing, and that it be formed with a continuous smooth surface unbroken only at a single point, which may be disposed in relation to the connecting rod bearing adjacent the junction of the connecting rod and the bearing cap.

The object, therefore, of this invention is to provide a mandrel for a babbitted connecting rod which may be expanded within the connecting rod journal without injury to the bearing surface.

Another object of the invention is to provide a mandrel which may be readily expanded within the connecting rod journal and while so expanded will effectuate a uniform pressure upon the periphery of the bore of the rod.

Other objects and advantages reside in the specific construction and aggroupment of elements peculiar to my structure as will become apparent from a more complete examination of this specification in the claims of which I have assembled and pointed out certain combinations of parts and specific constructions indicative of the scope and spirit of the invention.

Referring to the drawings which illustrate the preferred form of this invention:

Figure 1 is an elevational view of a straightening fixture embodying the invention;

Figure 2 is an enlarged medial section through the mandrel taken on a plane indicated by the line 2—2 in Figure 1;

Figure 3 is a section taken on a plane indicated by the line 3—3 in Figure 2;

Figure 4 is a horizontal section through the supporting arbor on the line 4—4 of Figure 3;

Figure 5 is a detailed view in perspective illustrating the expanding mandrel.

Referring now to the Figure 1 a straightening fixture is illustrated generally at 10 which comprises a base 11, a body or frame section 12, a plurality of screw jacks 13 operatively associated therewith and a pair of gauging pads or bosses 14.

The body 12 is transversely apertured near its base to receive a shaft 15, which in the present case, is secured in the base by frictional engagement within the aperture. The shaft 15 is formed with a flange 16 near its outer end and has an extended tapered portion or arbor 17 which is disposed beyond the flange 16 and overhangs the straightening fixture 10.

Upon the arbor 17 a mandrel 18 is mounted, this mandrel is bored throughout its length the bore being tapered to conform with the conoidal portion of the arbor 17. The mandrel 18 which is in the form of a sleeve, is retained against outward axial movements by a thrust plate 19 which is supported by a shaft 20 screw threaded into the outer end of the arbor 17 and extended through an aperture 21 in the plate 19. The terminating end of the shaft 20 is threaded to receive a collar 22 which is locked thereupon by set screws 23 and a jam nut 24. The collar 22 is radially apertured to accommodate the use of a pin wrench 25 which may be employed to adjust the screw 20. Within the arbor 17 and disposed intermediate the collar 22 and the plate 19 an outer anti-friction bearing 26 is provided to minimize the torque when the outer collar is tightened against the appertinent boss of the thrust plate 19.

The plate 19 may be retracted from the end of the arbor 17 by means of a flange 27 integrally formed upon the shaft and adapted to engage a recess 28 in the inner face of the thrust plate 19.

The plate 19 is restrained from rotative movement by a plurality of dowel pins 29 which are secured in the outer end of the mandrel and extend therefrom through enlarged apertures 30 in plate 19.

The mandrel 17 is preferably formed from a steel bar which is capable of being case hardened and ground and also of suitable resiliency to withstand the distribution to which it is subjected. As illustrated in Figures 2, 3 and 5 the mandrel is saw-cut or split throughout its length at 31 and is formed with a plurality of kerfs 32 radially disposed about the inner periphery of the mandrel and out to a depth relatively parallel to the medial axis thereof. The kerfs 32 extend throughout the length of the mandrel and are arranged circumferentially closer each other adjacent the saw-cut 31, than those diametrically opposite.

In the practice of my invention a connecting rod is inserted over the plate 19 and collar 22 and positioned upon the mandrel 17 so as to abut the flange 16. The pin wrench 25 is then adjusted into one of the radial apertures in the collar 22 and shaft 20 then rotated to effect the inward axial movement of the plate 19 against the end of the mandrel 18.

As the mandrel is drawn upon the tapered arbor 17 the spaced edges 33 will be retracted and the mandrel circumferentially distorted. When normally expanded the greatest distortion will occur adjacent the kerfs which are relatively diametrically opposite the saw-cut 31 but when the rod is in place and the mandrel is confined within the bearing the walls adjacent the spaced edges will also be distorted due to the aggroupment of the kerfs 32 and consequently the entire perimeter of the mandrel will conform to the contour of the connecting rod bearing.

When it is desired to remove the rod from the mandrel the pin wrench is again inserted into one of the radial apertures in the collar 22 and the collar rotated in a manner to effectuate the withdrawal of the screw 20 from the end of the shaft. The flange 27 abutting the end wall of the recess 28 will retract the plate 19 and permit the mandrel to become loosened upon a tapered arbor and to regain its unstressed form.

Although the foregoing description is necessarily of a detailed character in order that the invention may be completely set forth it is to be understood that the specific terminology is not intended to be restrictive or confining and that various rearrangements of parts and modifications of structural detail may be resorted to without departing from the scope or spirit of the invention as herein claimed.

What I claim is:

1. A mandrel comprising a tapered arbor, a split sleeve mounted thereon, the said sleeve having a plurality of kerfs cut in its inner periphery and means for drawing the sleeve upon the tapered portion of the arbor.

2. A mandrel comprising a tapered arbor, a split sleeve mounted thereon, the said sleeve having a plurality of kerfs cut in its inner periphery and disposed relatively closer circumferentially adjacent the split portion of the sleeve than they are in the diametrically opposite side thereof and means for drawing the sleeve upon the tapered portion of the arbor.

3. A mandrel comprising a tapered arbor, a split sleeve mounted thereon, the said sleeve having a plurality of kerfs radially disposed and extended parallel to the medial axis of the sleeve throughout its length and arranged relatively closer circumferentially adjacent the split portion of the sleeve than they are in the diametrically opposite side thereof and means for drawing the sleeve upon the tapered portion of the arbor.

4. A mandrel comprising a tapered arbor, a split sleeve mounted thereon and conformable therewith, the said sleeve having a plurality of kerfs cut in its inner periphery radially disposed and extended throughout the length of the sleeve parallel its medial axis, the said kerfs disposed relatively closer circumferentially adjacent the split in the said sleeve than those diametrically opposite, a shaft threaded in the outer end of the tapered arbor, a collar affixed to the terminating end of the shaft and a thrust plate supported by said shaft and axially engageable with the said collar and said split sleeve.

5. A mandrel comprising a tapered arbor, a split sleeve mounted thereon, the said sleeve having a plurality of kerfs cut in its inner periphery, a shaft threaded into the outer end of the tapered arbor, a thrust plate supported by said shaft and means for engageably adjusting and retracting said thrust plate with the said split sleeve.

6. A mandrel comprising a tapered arbor, a split sleeve mounted thereon, the said sleeve having a plurality of kerfs cut in its inner periphery, a shaft threaded into the outer end of the tapered arbor, a thrust plate supported by said shaft, a collar affixed to the terminating end of said shaft, an anti-friction thrust bearing intermediate said collar and the said plate and means for engageably adjusting and retracting said thrust plate with the said split sleeve.

In testimony whereof I hereunto affix my signature this 18th day of November, 1927.

JAMES W. HOWELL.